United States Patent
Haapalehto et al.

(10) Patent No.: US 6,671,282 B1
(45) Date of Patent: Dec. 30, 2003

(54) PROCEDURE FOR DETERMINING REGISTER RECALL FILTERING TIMES IN A TELECOMMUNICATION SYSTEM IN CONJUNCTION WITH A V5 INTERFACE

(75) Inventors: Kari Haapalehto, Oulu (FI); Martti Yrjana, Tupos (FI); Arto Tihonen, Oulu (FI); Pekka Korhonen, Oulu (FI); Mika Pelkonen, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/519,969

(22) Filed: Mar. 7, 2000

Related U.S. Application Data

(63) Continuation of application No. PCT/FI98/00682, filed on Sep. 1, 1998.

(30) Foreign Application Priority Data

Sep. 9, 1997  (FI) ................................................. 973645

(51) Int. Cl.⁷ .......................... H04L 12/28; H04L 12/56
(52) U.S. Cl. ...................... 370/401; 370/402; 370/404
(58) Field of Search ................................ 370/400, 401, 370/402, 404, 329, 341, 345, 426, 464, 463, 442, 496, 497, 498; 455/560, 561, 555, 564; 379/280, 288, 355, 359, 158, 399.01, 399.02, 413.02, 393

(56) References Cited

FOREIGN PATENT DOCUMENTS

| GB | 1554837 | * 10/1979 | .......... H03K/17/28 |
| JP | 58146168 | * 8/1983 | ............ H04M/3/42 |
| WO | WO 96/15638 | * 5/1996 | ............. H04Q/7/22 |
| WO | WO 97/35404 | * 9/1997 | ............. H04L/12/24 |

OTHER PUBLICATIONS

Mar. 10, 1999, International Search Report for PCT/FI98/00682.

* cited by examiner

Primary Examiner—Wellington Chin
Assistant Examiner—Jamal A. Fox
(74) Attorney, Agent, or Firm—Squire, Sanders & Dempsey, L.L.P.

(57) ABSTRACT

Procedure for determining register recall filtering time in a telecommunication system in conjunction with a V5 interface in different national mappings. The telecommunication system comprises a local exchange (LE); an access node (AN), which is provided with means responsible for the register recall function; a V5 interface (V5) connecting the access node to the local exchange; a number of subscriber-line interface plug-in units (PIU) disposed in the local exchange (LE) and/or in the access node (AN) and comprising storage means in which the setting parameters associated with the register recall filtering time are set; and a number of analogue subscribers (Z), whose subscriber lines are connected via subscriber-line interface plug-in units (PIU) to the access node (AN) and/or directly to the local exchange (LE), and in which system a blackout of predetermined duration is generated in the subscriber line to allow register recall, the duration of said blackout corresponding to the value defined by the national subscriber-line interface mapping. In the procedure, the setting mode regarding the register recall filtering time is defined in the access node (AN) by means of an access node specific parameter; and, based on this parameter, a setting message defining setting times for the register recall filtering times is sent to the subscriber-line interface plug-in unit (PIU).

7 Claims, 1 Drawing Sheet

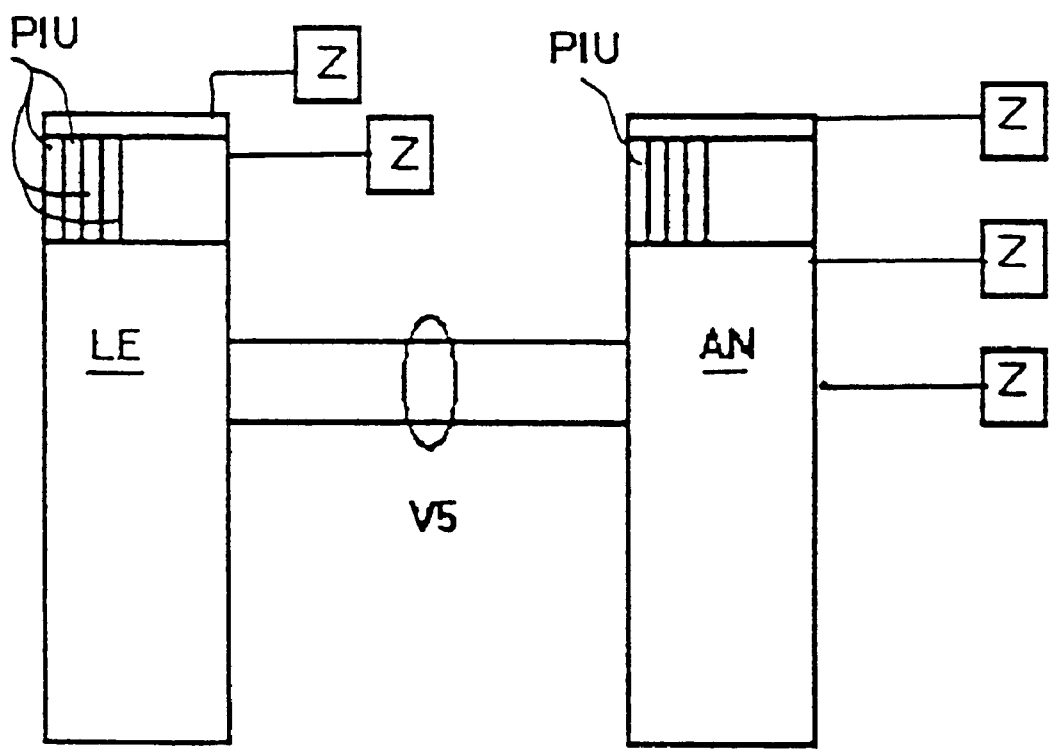

PROCEDURE FOR DETERMINING REGISTER RECALL FILTERING TIMES IN A TELECOMMUNICATION SYSTEM IN CONJUNCTION WITH A V5 INTERFACE

This application is a continuation of international application Ser. No. PCT/FI98/00682, filed Sep. 1, 1998.

The present invention relates to a procedure as defined in the preamble of claim 1.

There is a prior-art method for determining the register recall filtering times in a telecommunication system in conjunction with a V5 interface in different national mappings. The telecommunication system in which the method is applied comprises a telephone exchange; an access node comprising means responsible for the register recall function; a V5 interface connecting the access node to the local exchange; a number of subscriber-line interface plug-in units disposed in the local exchange and/or in the access node and comprising storage means in which the setting parameters associated with the register recall filtering time, such as minimum and maximum values (Rmin and Rmax) and delay (Rdelay), are set. The subscriber's lines for analogue subscribers are connected via subscriber-line interface plug-in units to the access node and/or directly to the local exchange.

Register recall is achieved by creating a blackout of predetermined duration in the subscriber line. The duration of the blackout corresponds to a value defined by the national subscriber-line interface mapping. The register recall function is used e.g. in an enquiry call, i.e. when an ongoing call is to be held while a second call is made to a different number. This is done by pressing the R key, whereupon the user gets a dial tone and is able to make a second call while the previous call is being held. Typically, this function has been used in switchboards, but nowadays it can be used in the public telephone network as well. Telephone sets have an R or Recall key, which can be used to produce in the subscriber line a blackout which is interpreted as a register recall if it fits into certain limits. The duration of the subscriber line blackout produced by pressing the R key in different telephones may vary from a few milliseconds to a few hundred milliseconds. Therefore, minimum and maximum values have been defined for the filtering time. If the subscriber line blackout produced by pressing the R key on the telephone set falls between the minimum and maximum values, then it means register recall. As the filtering times are different in the national mappings of different countries, a register recall setting is required. On the other hand, it is not always allowed for all subscribers, so it is a subscriber-specific option.

In some mappings the V5 interface carries a register recall setting message while in others it does not. In other words, there must be a possibility to turn the filtering times on/off both under local exchange control and without it. Moreover, national subscriber-line interface mappings contain different interpreting times for register recall (and also for decadic dialling and onhook).

A problem with prior-art technology is that there is no possibility to turn the filtering times on/off both under local exchange control and without it, i.e. regardless of whether a setting message is transmitted over the V5 interface or not. Even though it has been possible to use the same subscriber-line interface plug-in unit both in the access node and in the local exchange, it has not been possible to effect all national mappings using one and the same subscriber-line interface plug-in unit. Besides, it has not been possible to implement different national mappings regarding register recall in the access node.

The object of the present invention is to eliminate the drawbacks described above.

A specific object of the present invention is to disclose a procedure that enables the filtering times to be turned on/off both under local exchange control and without it, i.e. regardless of whether a setting message is transmitted over the V5 interface or not. Moreover, it makes it possible to use the same subscriber-line interface plug-in unit both in the local exchange and in the access node and to effect all national mappinas using one and the same subscriber-line interface plug-in unit. Different national mappings regarding register recall can be implemented in the access node as well.

The procedure of the invention is characterised by what is presented in claim 1.

According to the invention, the setting mode regarding the register recall filtering time is defined in the access node by means of an access node specific parameter; and, based on this parameter, a setting message defining setting times for register recall filtering times is sent to the subscriber-line interface plug-in unit.

The invention provides the advantage that the filtering times can be turned on/off both under local exchange control and without it, i.e. regardless of whether the setting message is transmitted over the V5 interface or not. Furthermore, it makes it possible to use the same subscriber-line interface plug-in unit both in the local exchange for direct subscribers and in the access node. In the local exchange, the existing subscriber-line interface plug-in units already in use for direct subscribers, in which the filtering time settings have already been made, need not be changed in any way. For example, the PROM memory (programmable read-only memory, whose data content can be programmed only once) in the subscriber-line interface plug-in unit that stores the setting regarding the register recall filtering method need not be changed. Instead, new subscriber-line interface plug-in units that are installed in the access node or in the local exchange may contain the procedure of the invention in the software of the subscriber-line interface plug-in unit. The existing register recall filtering times for direct subscribers in the local exchange continue functioning as before, regardless of whether the subscriber-line interface plug-in unit used is provided with a newer or an older type of PROM. An older type of subscriber-line interface plug-in unit is one in which it is only possible to turn the filtering time on or off under local exchange control so that register recall and decadic dialling are not possible at the same time.

A further advantage is that different national mappings regarding register recall can be implemented in the access node as well.

In an embodiment of the procedure, the setting mode defined is that the filtering time is set and reset under local exchange control so that register recall and decadic dialling are not possible at the same time.

In an embodiment of the procedure, the setting mode defined is that the filtering time is set and reset under local exchange control so that register recall and decadic dialling are possible at the same time.

In an embodiment of the procedure, the setting mode defined is that the filtering time is set and reset without local exchange control so that register recall and decadic dialling are possible at the same time.

In an embodiment of the procedure, the setting mode defined is that the filtering time is set and reset without local exchange control so that register recall and decadic dialling are not possible at the same time.

In an embodiment of the procedure, the setting parameters relating to the filtering time are stored in memory in the subscriber-line interface plug-in unit.

In an embodiment of the procedure, the parameter corresponding to the register recall setting mode is read by the signalling programme of the analogue subscriber-line interface in the access node.

In the following, the invention will be described in detail by the aid of an embodiment example by referring to the attached drawing, which represents a system in which the procedure of the invention is implemented.

FIG. 1 presents a telecommunication system comprising a local exchange LE and an access node AN. The access node comprises means responsible for the register recall function. The access node AN is connected to the local exchange via a V5 interface. The local exchange LE and the access node AN contain a number of subscriber-line interface plug-in units PIU, which are provided with data storage means in which the setting parameters relating to the register recall filtering time, such as minimum and maximum filtering time values Rmin and Rmax as well as a delay time Rdelay are set. The subscriber's lines of analogue subscribers Z are connected via the subscriber-line interface plug-in units PIU to the access node, AN and directly to the local exchange LE. Register recall is effected in the system by generating a blackout of predetermined duration in the subscriber line, the duration of said blackout corresponding to the value defined by the national subscriber-line interface mapping.

In the access node AN, the setting mode regarding the register recall filtering time is defined by means of an access node specific parameter. This parameter determines the setting mode by selecting one of the following alternatives:

a) The filtering time is set and reset under the control of the local exchange LE so that register recall and decadic dialling are not possible at the same time.

b) The filtering time is set and reset under the control of the local exchange LE so that register recall and decadic dialling are possible at the same time.

c) The filtering time is set and reset without the control of the local exchange LE so that register recall and decadic dialling are possible at the same time.

d) The filtering time is set and reset without the control of the local exchange LE so that register recall and decadic dialling are not possible at the same time.

In the access node AN, the signalling programme of the analogue subscriber-line interface Z, disposed in a computer called Access Network Controller Unit (ANCU), reads this parameter and, based on it, sends the correct setting message to the subscriber module, from where they a transmitted to the subscriber-line interface plug-in unit PIU. The setting messages convey the register recall filtering times (Rmin, Rmax and Rdelay), which are also access node specific parameters, which means that they are readable from the ANCU. The number of the message, i.e. the above-mentioned parameter, can be used to determine whether, in the particular case, register recall and decadic dialling are simultaneously possible or not. Owing to the use of different messages, no changes concerning direct subscribers in the local exchange need to be made in subscriber-line interface plug-in units implemented earlier or in the local exchange software. Furthermore, a subscriber-line interface plug-in unit having new settings for recall of the register in the access node AN is suited for use both in the access node and in the local exchange for direct subscribers.

The invention is not restricted to the embodiment described above as an example, but many variations are possible within the scope of the inventive idea defined by the claims.

What is claimed is:

1. Procedure for determining register recall filtering times in a telecommunication system in conjunction with a V5 interface in different national mappings, said telecommunication system comprising a local exchange (LE); an access node (AN), which is provided with means responsible for the register recall function; a V5 interface (V5) connecting the access node to the local exchange; a number of subscriber-line interface plug-in units (PIU) disposed in the local exchange (LE) and/or in the access node (AN) and comprising storage means in which the setting parameters associated with the register recall filtering time, such as minimum and maximum values (Rmin and Rmax) of the filtering time as well as a delay time (Rdelay) are set; and a number of analogue subscribers (Z), whose subscriber lines are connected via subscriber-line interface plug-in units (PIU) to the access node (AN) and/or directly to the local exchange (LE), in which system, to effect register recall, a blackout of predetermined duration is generated in the subscriber line, the duration of said blackout corresponding to the value defined by the national subscriber-line interface mapping, characterised in that the setting mode regarding the register recall filtering time is defined in the access node (AN) by means of an access node specific parameter; and, based on this parameter, a setting message defining setting times for the register recall filtering times is sent to the subscriber-line interface plug-in unit (PIU).

2. Procedure as defined in claim 1, characterised in that the setting mode defined is that the filtering time is set and reset under the control of the local exchange (LE) so that register recall and decadic dialling are not possible at the same time.

3. Procedure as defined in claim 1, characterised in that the setting mode defined is that he filtering time is set and reset under the control of the local exchange (LE) so that register recall and decadic dialling are possible at the same time.

4. Procedure as defined in claim 1, characterised in that the setting mode defined is that the filtering time is set and reset without the control of the local exchange (LE) so that register recall and decadic dialling are possible at the same time.

5. Procedure as defined in claim 1, characterised in that the setting mode defined is that the filtering time is set and reset without the control of the local exchange (LE) so that register recall and decadic dialling are not possible at the same time.

6. Procedure as defined in claim 1; characterised in that the setting parameters relating to the filtering time are stored in memory in the subscriber-line interface plug-in unit (PIU).

7. Procedure as defined in claim 1, characterised in that the parameter corresponding to the register recall setting mode is read by the signalling programme of the analogue subscriber-line interface (Z) in the access node (AN), and a setting message corresponding to the parameter is sent via the access node to the subscriber-line interface plug-in unit (PIU).

* * * * *

UNITED STATES PATENT AND TRADEMARK OFFICE
CERTIFICATE OF CORRECTION

PATENT NO. : 6,671,282 B1 Page 1 of 1
DATED : December 30, 2003
INVENTOR(S) : Haapalehto et al.

It is certified that error appears in the above-identified patent and that said Letters Patent is hereby corrected as shown below:

<u>Title page,</u>
Item [75], Inventors, should read -- Arto TIIHONEN --

Signed and Sealed this

Twenty-ninth Day of June, 2004

JON W. DUDAS
*Acting Director of the United States Patent and Trademark Office*